US009514579B2

(12) United States Patent
Lee

(10) Patent No.: US 9,514,579 B2
(45) Date of Patent: Dec. 6, 2016

(54) METHOD AND APPARATUS FOR CHECKING VEHICLE SPECIFICATION

(71) Applicant: HYUNDAI MOTOR COMPANY, Seoul (KR)

(72) Inventor: Jang Yong Lee, Jeollabuk-do (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/612,286

(22) Filed: Feb. 2, 2015

(65) Prior Publication Data

US 2015/0243110 A1 Aug. 27, 2015

(30) Foreign Application Priority Data

Feb. 21, 2014 (KR) ........................ 10-2014-0020552

(51) Int. Cl.
*G06F 19/00* (2011.01)
*G07C 5/00* (2006.01)
*G07C 5/08* (2006.01)

(52) U.S. Cl.
CPC ............. *G07C 5/008* (2013.01); *G07C 5/0808* (2013.01); *G07C 2205/02* (2013.01)

(58) Field of Classification Search
CPC ... G07C 5/006; G07C 5/0808; G07C 2205/02; B60L 2240/70; B60L 3/12; H04L 29/06
USPC ...... 701/31.4, 29.1, 34.4, 36, 33.7; 340/540; 370/254; 709/201
See application file for complete search history.

(56) References Cited

U.S. PATENT DOCUMENTS 7,039,511 B1 5/2006 Kreuz et al.
7,948,998 B2 * 5/2011 Isoyama ................ H04L 12/66 370/401
2013/0317668 A1 * 11/2013 Tarnutzer .......... H04L 12/40006 701/2

FOREIGN PATENT DOCUMENTS

| | | | |
|---|---|---|---|
| JP | 2007-028377 | A | 2/2007 |
| KR | 10-0229156 | B1 | 11/1999 |
| KR | 10-2009-0054533 | A | 6/2009 |
| KR | 10-1091675 | B1 | 12/2011 |
| KR | 2013-0021652 | A | 3/2013 |
| KR | 10-1272911 | B1 | 6/2013 |

* cited by examiner

*Primary Examiner* — Dalena Tran
(74) *Attorney, Agent, or Firm* — McDermott Will & Emery LLP

(57) ABSTRACT

A method for checking a vehicle specification includes operating terminal devices included in a vehicle. Control data is generated depending on an operation of the terminal devices. The control data is transferred to a gateway included in the vehicle. The control data is compared with vehicle specification matters stored in the gateway using the gateway. An error message is transmitted when the vehicle specification matters stored in the gateway do not match the control data.

10 Claims, 6 Drawing Sheets

-- Prior Art --

-- Prior Art --

METHOD AND APPARATUS FOR CHECKING VEHICLE SPECIFICATION

CROSS-REFERENCE TO RELATED APPLICATION

This application claims under 35 U.S.C. §119(a) the benefit of priority to Korean Patent Application No. 10-2014-0020552 filed on Feb. 21, 2014, the entire contents of which are incorporated herein by reference.

TECHNICAL FIELD

The present disclosure relates to a method and an apparatus for checking a vehicle specification. More particularly, the present disclosure relates to a method and an apparatus for checking a vehicle specification capable of checking whether a configuration of various terminal devices equipped in a vehicle is accurate.

BACKGROUND

Recently, with the development of electrical and electronic technologies in the automotive industry, a user demand for safety and convenience of a vehicle has been increased. The importance of the electrical and electronic technologies in the automotive industry has increased each year to meet the user demand, which is expected to accelerate in the future.

However, since more kinds of electronic control units (ECUs) are used in these technologies, there is a cost increase due to a diagnosis or data input of the ECUs. In particular, in the case of a commercial vehicle, various specifications are produced in a small quantity, and therefore, data need to be frequently input at an end of line (EOL) for each ECU.

However, vehicle specifications may be erroneously configured by manufacturer's errors, parts omission, or mounting of wrong parts during the above process.

FIG. 1 is a diagram illustrating a process of inputting data to an ECU of a vehicle during a typical post-process line.

In the final process of the typical post-process line after an assembly of a vehicle 20, a diagnostics and specification input device 30 is connected to an on-board diagnostics connector 10 of the vehicle 20 to input parameters and specification information for each part. However, protocols for each ECU are different in this process, and therefore, the input parameters may be complicated, and wrong specification information may be input to the ECUs. Further, even when the wrong specification information is input, it is difficult to verify the error.

FIG. 2 is a diagram illustrating a process of changing data of the ECU of the vehicle using a portable diagnostic device in a service center.

When parts of the vehicle 20 are defective, the service center needs to replace the parts and re-input data information to the vehicle 20. Further, the related art needs to individually input data in this process by connecting a portable diagnostic device 40 to the on-board diagnostics connector 10 of the vehicle 20, but wrong data may be input to the ECU during this process.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to solve the above-described problems associated with prior art. The present disclosure provides a method and an apparatus for checking a vehicle specification capable of checking for an incorrect vehicle specification using a central vehicle configurator (gateway) provided in the vehicle.

According to an exemplary embodiment of the present disclosure, a method for checking a vehicle specification includes operating terminal devices provided in a vehicle. Control data is generated depending on an operation of the terminal devices. The control data is transferred to a central vehicle configurator provided in the vehicle. The control data is compared with vehicle specification matters stored in the central vehicle configurator using the central vehicle configurator. An error message is transmitted when the vehicle specification matters stored in the central vehicle configurator do not match the control data.

The method for checking a vehicle specification may further include injecting the vehicle specification matters to the central vehicle configurator using an end of line (EOL) device, prior to the operating of the terminal devices provided in the vehicle.

The control data may be controller area network (CAN) message based control data or signal based control data. The signal based control data may be configured by adding the control data generated from the terminal device, to which a predetermined CAN ID is added, to a data field of the CAN message.

The step of comparing the control data with the vehicle specification matters stored in the central vehicle configurator using the central vehicle configurator may include checking information on an ID field of the control data when the control data is the CAN message based control data and comparing whether the information on the ID field matches information on the vehicle specification matters stored in the central vehicle configurator.

The step of comparing of the control data with the vehicle specification matters stored in the central vehicle configurator using the central vehicle configurator may include checking the information on the ID field of the control data when the control data is the signal based control data and comparing whether a value of the data field of the control data matches the information on the vehicle specification matters stored in the central vehicle configurator.

According to another embodiment of the present disclosure, an apparatus for checking a vehicle specification includes terminal devices configured to be provided in a vehicle. A central vehicle configurator is configured to receive control data between the terminal devices and compare the received control data with information on prestored vehicle specification matters to output an error message when the control data does not match the information on the vehicle specification matters. The control data is CAN message or signal based control data, and the signal based control data is configured by adding the control data generated from the terminal device, to which a predetermined CAN ID is added, to a data field of the CAN message.

The central vehicle configurator may check information on an ID field when the control data is the CAN message based control data and output an error message when information on the ID field does not match information on the vehicle specification matters stored in the central vehicle configurator.

The central vehicle configurator may check information on an ID field when the control data is the signal based control data and output an error message when a value of the data field of the signal based control data does not match the information on the vehicle specification matters stored in the central vehicle configurator.

As set forth above, the method and apparatus for checking a vehicle specification according to the embodiments of the present disclosure use a central vehicle configurator to compare the control data transmitted by each terminal device within the vehicle with the specification information stored in the central vehicle configurator and transmit the compared result, thereby easily checking the wrong vehicle specification. Therefore, it is possible to check whether the specifications are accurately configured as soon as possible even though parts are replaced in the manufacturing process or the maintenance process of the vehicle.

Other aspects and embodiments of the invention are discussed infra.

It is understood that the term “vehicle” or “vehicular” or other similar term as used herein is inclusive of motor vehicles in general, such as, passenger automobiles including: sports utility vehicles (SUV); buses; trucks; and various commercial vehicles, watercraft including: a variety of boats and ships, aircraft, and the like, and includes: hybrid vehicles; electric vehicles; plug-in hybrid electric vehicles; hydrogen-powered vehicles; and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure.

Figure 1:
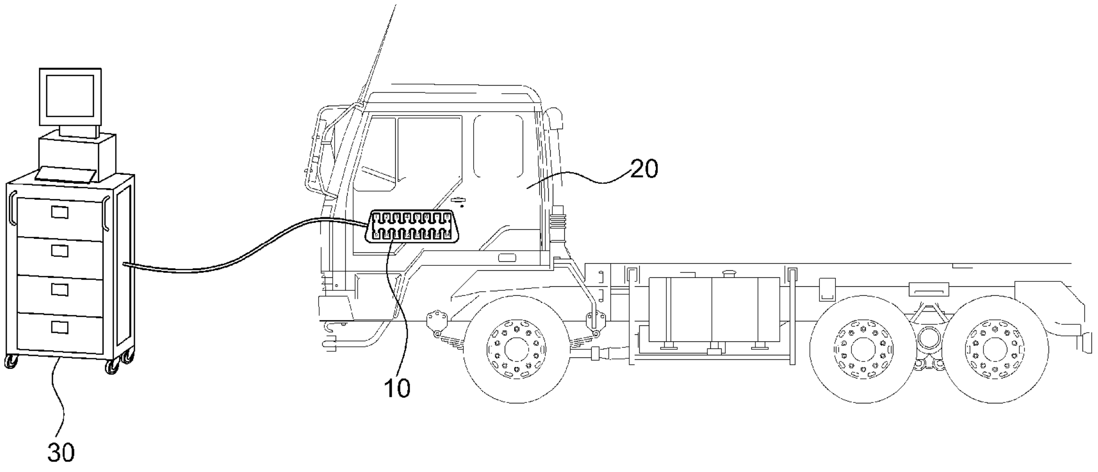
FIG. 1 is a diagram illustrating a process of inputting data to an ECU of a vehicle in a typical post-process line.
Figure 2:
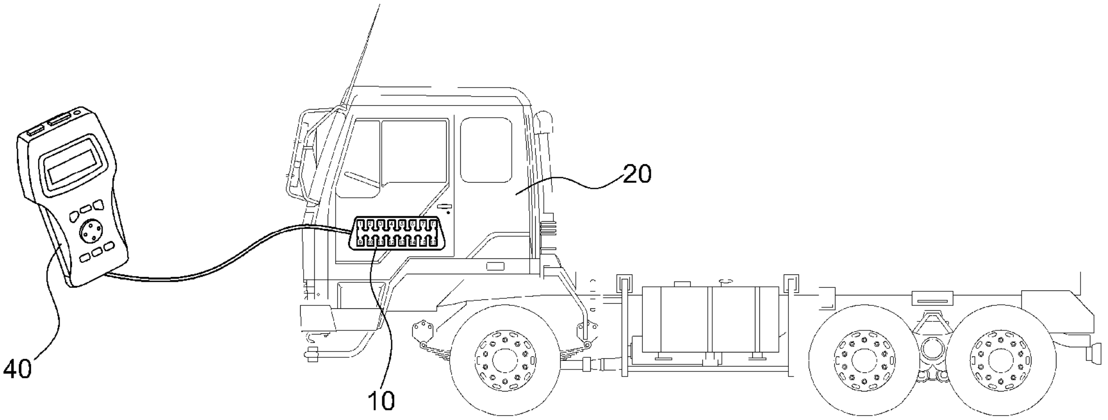
FIG. 2 is a diagram illustrating a process of changing the data of the ECU of the vehicle in a service center.

It should be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Figure 3:
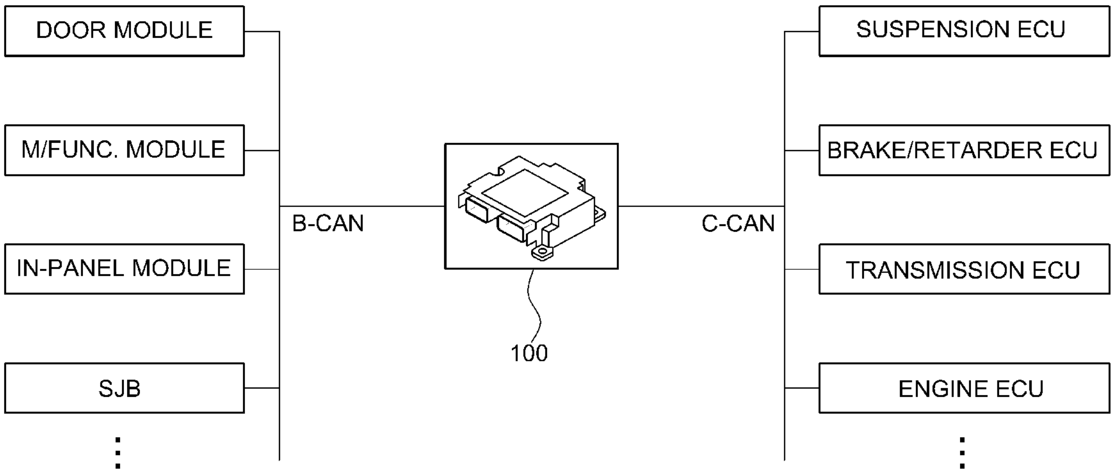
FIG. 3 is a diagram schematically illustrating an apparatus for checking the vehicle specification equipped in a vehicle according to an exemplary embodiment of the present disclosure.

FIG. 3 is a diagram schematically illustrating an apparatus for checking a vehicle specification equipped in the vehicle according to an exemplary embodiment of the present disclosure.

A central vehicle configurator (gateway) 100 of an apparatus for checking a vehicle specification according to an exemplary embodiment of the present disclosure is located at a center of a network which connects terminal devices within a vehicle to communicate between the respective terminal devices.

The central vehicle configurator 100 may serve to relay communication between a body-CAN (B-CAN) configured of body controllers and a chassis-CAN (C-CAN) configured of chassis controllers. Further, the central vehicle configurator 100 may communicate with at least one of a plurality of CANs, local interconnect network (LIN), FlexRay, and Ethernet.

A door switch module, a multi-function switch module, an in-panel switch module, and the like are identified by a part number. A suspension electronic control unit (ECU), a brake/retarder ECU, a transmission ECU, an engine ECU, a smart junction box (SJB), and the like require an end of line (EOL) device.

The apparatus for checking the vehicle specification according to the exemplary embodiment of the present disclosure checks control data transmitted by the various terminal devices to check whether vehicle specifications are correctly inputted.

Figure 4:
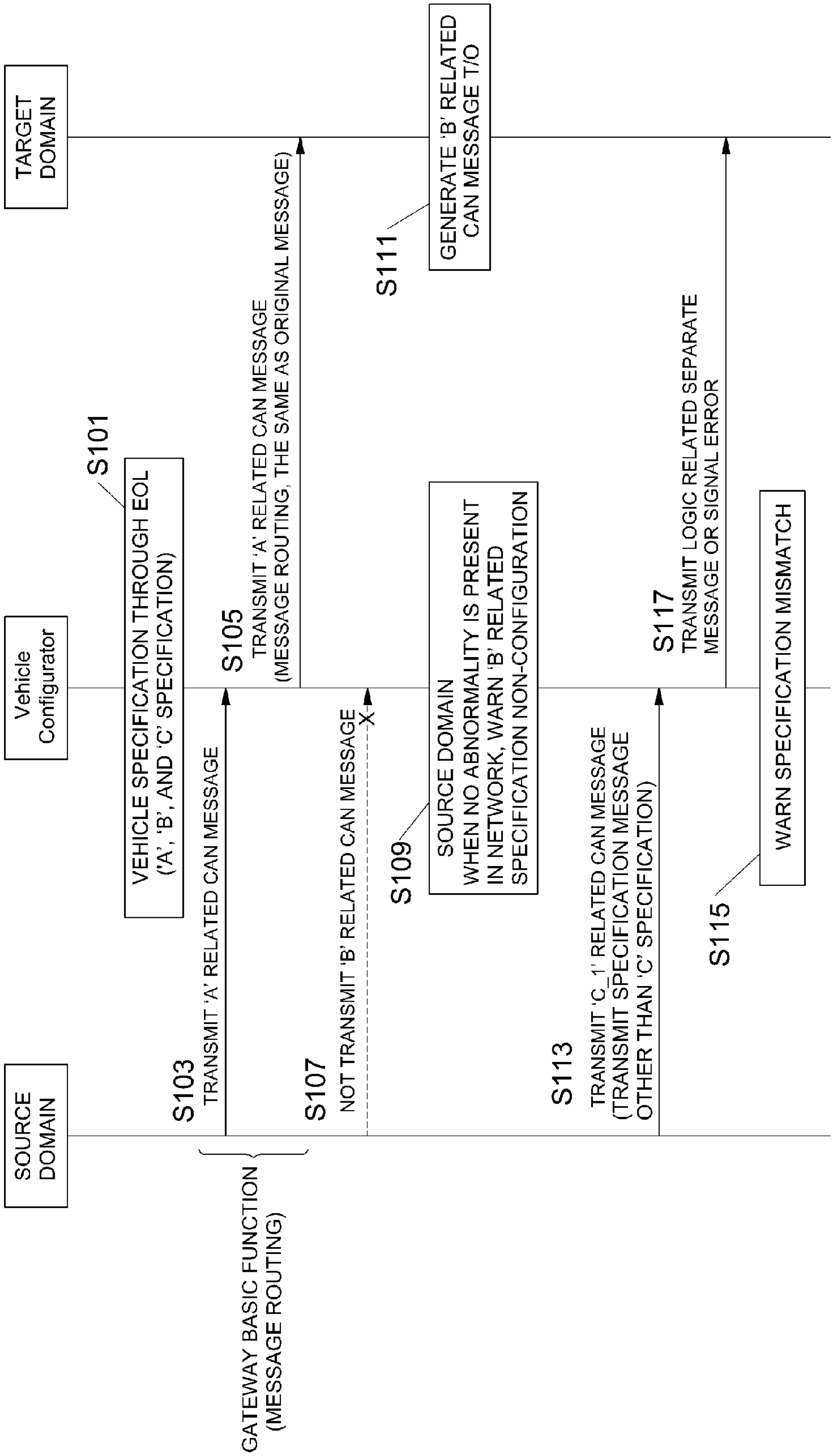
FIG. 4 is a diagram illustrating an operation process of a method for checking a vehicle specification according to an exemplary embodiment of the present disclosure and illustrating a process of checking whether the vehicle specification is properly configured by checking a CAN message.

FIG. 4 is a diagram illustrating an operation process of a method for checking a vehicle specification according to an exemplary embodiment of the present disclosure and illustrating a process of checking whether the vehicle specification is properly configured by checking a CAN message.

First, the central vehicle configurator 100 of the apparatus for checking a vehicle specification according to the exemplary embodiment of the present disclosure may receive and store the vehicle specifications using the end of line device (S101). For example, the central vehicle configurator 100 may store information on ‘A’, ‘B,’ and ‘C’ specifications.

Next, a source domain may transmit an ‘A’ related CAN message to the central vehicle configurator 100 (S103). In this configuration, the source domain may be a terminal device within the vehicle, and the CAN message transmitted by the source domain may be the control data including information which is linked and operated when the source domain is operated.

When the 'A' related CAN message is received, the central vehicle configurator 100 may check whether 'A' related specification information is present. When the corresponding specification information is present, the specification information is transmitted to a target domain (S105). That is, the CAN message transmitted by the source domain may also be transmitted to the target domain.

Therefore, the apparatus for checking a vehicle specification according to the exemplary embodiment of the present disclosure may check that an 'A' related control device is properly configured. Further, the target domain may be a terminal device which is interconnected and operated depending on the operation of the source domain.

However, the source domain may not transmit a 'B' related CAN message even though a 'B' related terminal device is included in the vehicle (S107). In this case, the apparatus for checking the vehicle specification according to the exemplary embodiment of the present disclosure may transmit a 'B' related specification non-configuration error message since a 'B' related specification is not transmitted even though abnormality is not present between the source domain and the central vehicle configurator 100 (S109). In addition, since the target domain does not receive the 'B' related CAN message, a time out (T/O) data may be generated (S111).

As a result, the central vehicle configurator 100 of the apparatus for checking a vehicle specification according to the exemplary embodiment of the present disclosure may check whether the 'B' related specification is wrongly configured.

The source domain then may transmit a 'C_1' related CAN message to the central vehicle configurator 100 (S113). 'C-1' information is different from the specification information stored in the central vehicle configurator 100 of the vehicle, and therefore, the central vehicle configurator 100 of the apparatus for checking a vehicle specification according to the exemplary embodiment of the present disclosure may transmit a specification mismatch warning (S115).

An error message may be transmitted as a 'C' related separate message or signal to the target domain (S117).

Figure 5:
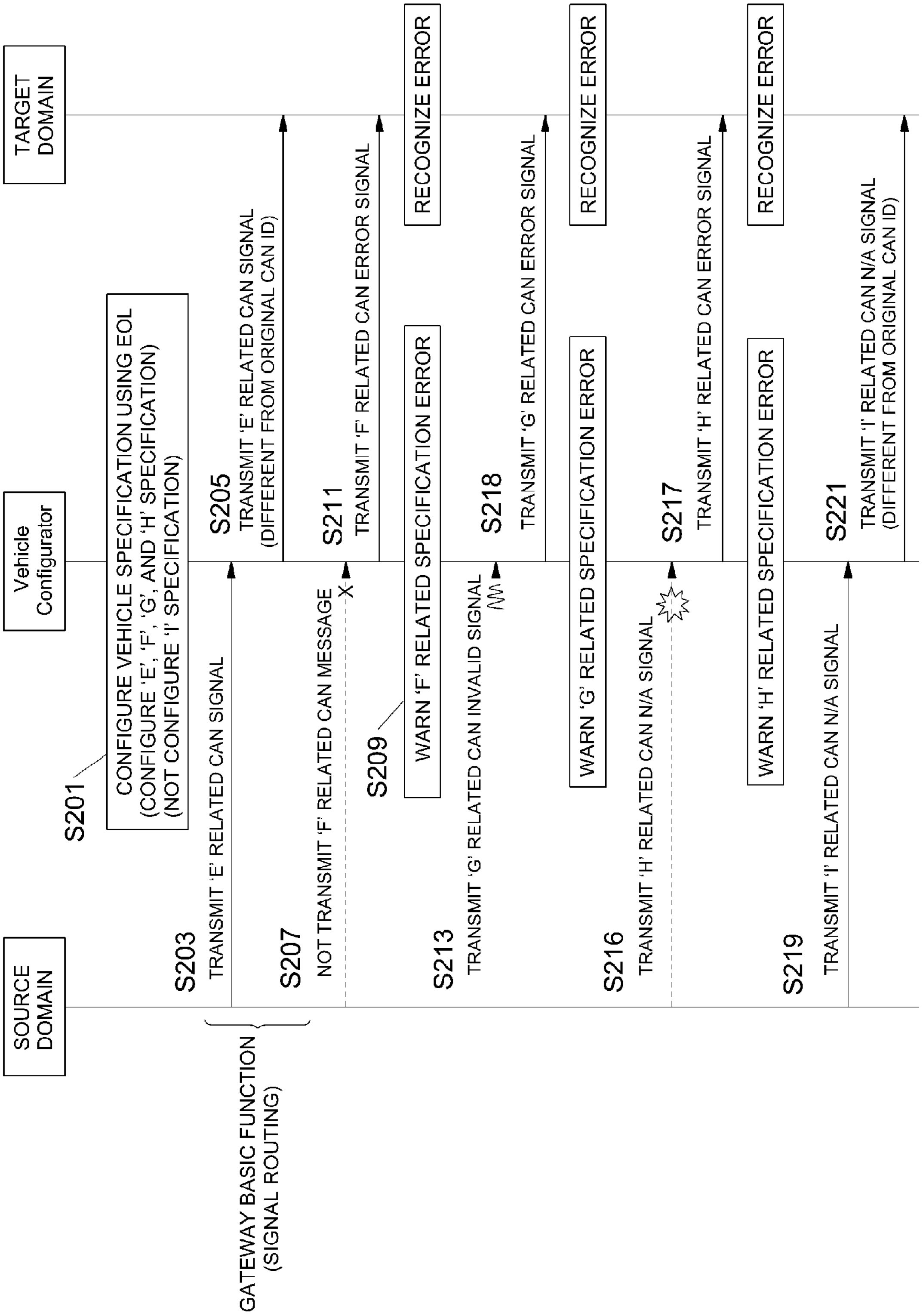
FIG. 5 is a diagram illustrating an operation process of a method for checking a vehicle specification according to an exemplary embodiment of the present disclosure and illustrating a process of checking whether a vehicle specification is properly configured by checking a CAN signal.

FIG. 5 is a diagram illustrating an operation process of a method for checking a vehicle specification according to an exemplary embodiment of the present disclosure and illustrating a process of checking whether the vehicle specification is properly configured by checking a CAN signal.

First, the central vehicle configurator 100 of the apparatus for checking a vehicle specification according to the exemplary embodiment of the present disclosure may receive the vehicle specification information of 'E', 'F', 'G,' and 'H' using the end of line (EOL) device (S201).

Next, the source domain may transmit an 'E' related CAN signal to the central vehicle configurator 100 (S203). After the central vehicle configurator 100 receives the 'E' related CAN signal, since 'E' is a specification configured within the vehicle, the specification may be transmitted to the target domain (S205).

In this process, a CAN ID which is transmitted to the target domain may be different from an original ID since the source domain is not an ECU terminal device but a terminal device identified by a part number, and therefore, the central vehicle configurator 100 receives CAN signal information and needs to convert the received CAN signal information again. This will be described below in more detail.

Next, the source domain may not transmit the 'F' related CAN message (S207). However, the central vehicle configurator 100 has 'F' related vehicle specification information, and therefore, the central vehicle configurator 100 of the apparatus for checking a vehicle specification according to the exemplary embodiment of the present disclosure may transmit an 'F' related specification error warning based on the 'F' related vehicle specification information (S209). Further, an 'F' related CAN error signal is transmitted to the target domain (S211), and thus, the target domain may recognize that errors occur in connection with the vehicle specification.

Then, the source domain in the apparatus for checking a vehicle specification according to the exemplary embodiment of the present disclosure may transmit a 'G' related CAN invalid signal (S213). Here, the invalid signal means a signal which is not actually used.

Therefore, although the 'G' is stored as information configured in the vehicle specification, the central vehicle configurator 100 considers the signal as an error to transmit the 'G' related specification error warning and the 'G' related CAN error signal to the target domain (S218). This will be described below in more detail.

The source domain may also transmit a not available (N/A) signal in connection with 'H' (S216). That is, the signal indicating that 'H' is not configured may be transmitted.

Therefore, although 'H' related vehicle specification information is stored in advance, when receiving the signal, the central vehicle configurator 100 of the apparatus for checking a vehicle specification according to the exemplary embodiment of the present disclosure may determine that errors occur in the specification in connection with 'H' and may transmit an error warning. An 'H' related CAN error signal is transmitted to the target domain (S217), and thus, the target domain may recognize that errors occur.

The source domain may transmit an 'I' related CAN N/A signal to the central vehicle configurator 100 (S219). The 'I' related signal is not stored in the central vehicle configurator 100, and therefore, the central vehicle configurator 100 according to the exemplary embodiment of the present disclosure may transmit a specification non-configuration warning and transmit the 'I' related CAN N/A signal to the target domain (S221).

Figure 6:
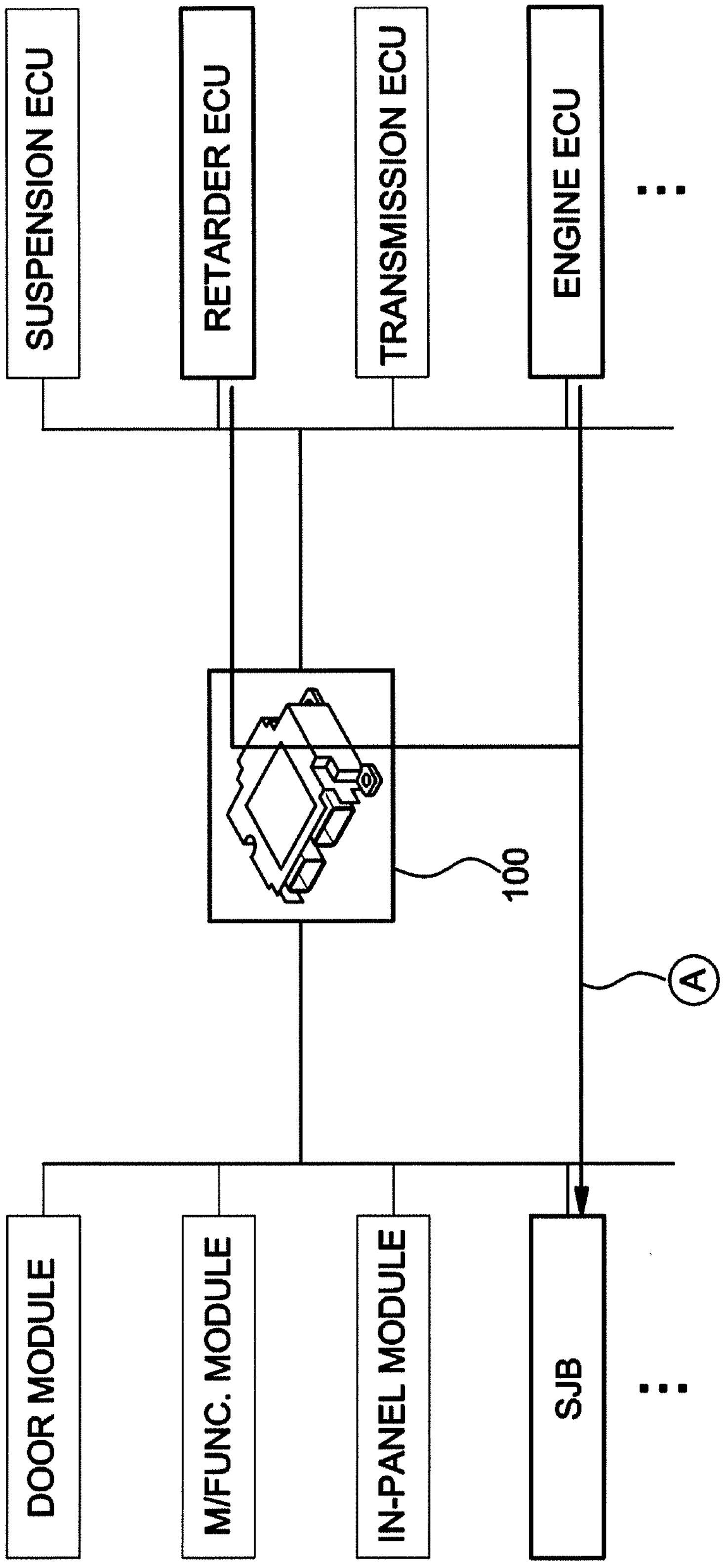
FIG. 6 is a diagram illustrating a process of allowing a user to operate an auxiliary brake and transferring control data to a smart junction box depending on the operation of the auxiliary brake to turn on a brake lamp.
Figure 7:
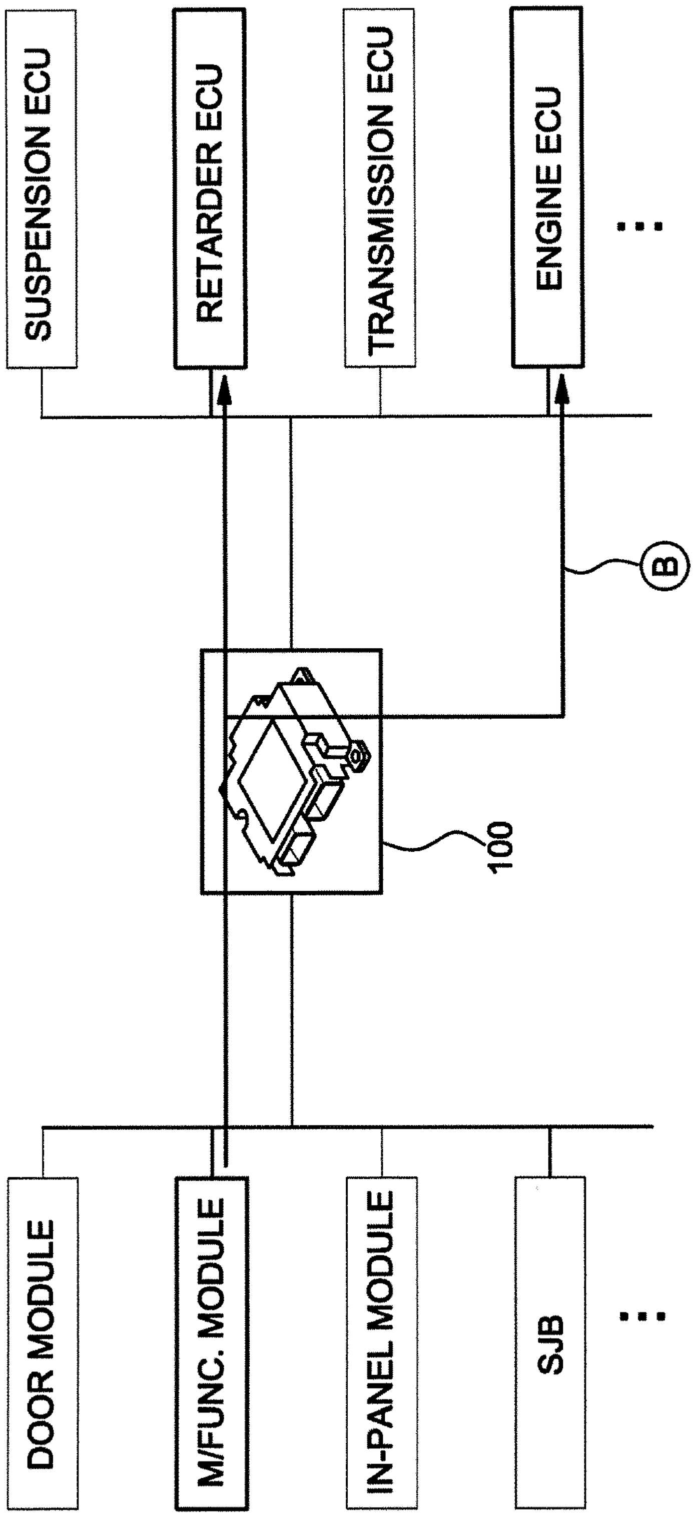
FIG. 7 is a diagram illustrating that a central vehicle configurator according to an exemplary embodiment of the present disclosure checks whether the vehicle specification is wrongly configured, in a process of operating the auxiliary brake in a multi-function module.

FIGS. 6 and 7 are diagrams illustrating a process of allowing the central vehicle configurator 100 to recognize that vehicle specification matters have a problem while each terminal device of the vehicle is operated in the method of checking a vehicle specification according to the exemplary embodiment of the present disclosure.

FIG. 6 is a diagram illustrating a process of allowing a user to operate an auxiliary brake and transferring control data to a smart junction box depending on the operation of the auxiliary brake to turn on a brake lamp.

When an auxiliary brake, such as a Jake brake, an exhaust brake, and a retarder, is performed, a constant CAN message may be transmitted to the central vehicle configurator 100 along an 'A' line.

Then, the CAN message is checked in the central vehicle configurator 100 and may undergo a process of checking whether the CAN message relates to the terminal device in the vehicle specification information. That is, the CAN message may undergo a process of checking whether the CAN message indicates the control data associated with the brake lamp. The CAN message may be transmitted to the smart junction box to turn on the brake lamp.

However, when the control data, which is different from the vehicle specification information stored in the central vehicle configurator 100, is input, the control data may not match the vehicle specification matters, and therefore, the central vehicle configurator 100 according to the exemplary embodiment of the present disclosure may transmit a diagnostic trouble code (DTC), which is specification mismatch related information, to a cluster and the like.

FIG. 7 is a diagram illustrating that the central vehicle configurator 100 according to an exemplary embodiment of the present disclosure checks that the vehicle specification is wrongly configured, in a process of operating the auxiliary brake in a multi-function switch module.

When the multi-function switch module instructs the retarder, the engine, and the like to carry out the auxiliary brake, the multi-function switch module may transmit the information related thereto to the central vehicle configurator 100 along a 'B' line.

In this case, an apparatus for transmitting the CAN signal through a CAN network among modules identified by a part number, such as the multi-function module, inputs the control data corresponding to a predefined CAN ID to a data field, thereby transmitting the control data.

The central vehicle configurator 100 according to the exemplary embodiment of the present disclosure checks the CAN ID of the input CAN signal, and if it is determined that the checked CAN ID is the same as the predefined CAN ID, the central vehicle configurator 100 may check that the CAN ID are signal based control data.

A process of checking control information in the signal based control data and comparing the control information with the specification information stored in the central vehicle configurator 100 to check whether the control information is the information matching the vehicle specification may be performed. That is, a process of checking the information of the data field of the CAN signal to check whether the information is related to the vehicle specification may be performed.

If the checked information matches the specification information of the vehicle, the central vehicle configurator 100 according to the exemplary embodiment of the present disclosure may convert the information into the CAN message which is the control data understood by the retarder or engine controllers and transmit the CAN message to the corresponding target domain.

However, when the checked information does not match the specification information which is stored in the central vehicle configurator 100, the central vehicle configurator 100 according to the exemplary embodiment of the present disclosure may bring up a fault code message on the vehicle cluster or the like and may inform the specification mismatch.

The control data designated as the CAN signal in the method and apparatus for checking a vehicle specification according to the exemplary embodiment of the present disclosure will be described in more detail.

First, according to the exemplary embodiment of the present disclosure, the CAN message is the control data which is written depending on a CAN communication protocol and is configured of a sum of data fields which is a sum of an ID field based on a frame as a minimum unit and individual data.

The CAN signal designates a portion of a data part of the CAN message and may designate the minimum unit, which is important, in communication. Further, the CAN signal may designate the control data to which the predetermined CAN ID is added. For example, the CAN signal uses a CAN ID of '0x18AAFF38' and may designate the control data to which the information required for the data field is added. Further, when the control data is input, the central vehicle configurator 100 according to the exemplary embodiment of the present disclosure may recognize the control data as the CAN signal based control data.

The CAN signal may transmit the desired information to the central vehicle configurator 100 according to the exemplary embodiment of the present disclosure using the data field in the CAN data frame structure. The CAN signal may input the desired control data to any bit of a data field byte as values of 2 bits or 3 bits and may transfer desired data to the terminal device to be controlled based on the values.

The central vehicle configurator 100 according to the exemplary embodiment of the present disclosure may recognize each bit value to identify each control data as valid, invalid, and N/A, respectively. Here, the valid data may designate a data value which is actually used as a signal, the invalid data may designate the data value which is not actually used, and the N/A may designate that the specification is not yet configured.

Therefore, the central vehicle configurator 100 receiving the CAN signal may analyze the CAN signal and compare the analyzed CAN signal with the prestored vehicle specification information to identify whether the configuration is correct and convert and transmit the CAN signal into the CAN message which may be understood by the ECU terminal devices.

For example, in the case in which the multi-function switch module is operated, when the specification is configured to operate only the Jake brake, a valid value needs to be input only to the Jake brake of the data field of the CAN signal. However, when other values are input, the other values are recognized as information which is not matched with the vehicle specification matters, and the error message may be transmitted.

The present disclosure has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for checking a vehicle specification, comprising steps of:

inputting, by an end of line (EOL) device, vehicle specification matters to a central vehicle configurator included in a vehicle;

after the inputting of the vehicle specification matters to the central vehicle configurator, operating, by a first controller, terminal devices included in the vehicle;

generating, by the terminal devices, control data depending on the operation of the terminal devices;

transferring, by the terminal devices, the control data to the central vehicle configurator included in the vehicle;

comparing, by the central vehicle configurator, the control data with vehicle specification matters stored in the central vehicle configurator; and transmitting, by the central vehicle configurator, an error message when the vehicle specification matters stored in the central vehicle configurator do not match the control data generated from the terminal devices included in the vehicle.

2. The method of claim 1, wherein the control data is controller area network (CAN) message based control data or signal based control data, and the signal based control data is configured by adding the control data generated from the terminal devices, to which a predetermined CAN ID is added, to a data field of the CAN message.

3. The method of claim 2, wherein the step of comparing the control data with the vehicle specification matters includes steps of:

checking information on an ID field of the control data when the control data is the CAN message based control data; and comparing whether the information on the ID field matches information on the vehicle specification matters stored in the gateway.

4. The method of claim 2, wherein the step of comparing the control data with the vehicle specification matters includes steps of:

checking information on an ID field of the control data when the control data is the signal based control data; and comparing whether a value of the data field of the control data matches the information on the vehicle specification matters stored in the gateway.

5. The method of claim 1, wherein the central vehicle configurator is a gateway.

6. The method of claim 1, wherein the central vehicle configurator communicates with at least one of a plurality of CANs, local interconnect network (LIN), FlexRay, and Ethernet.

7. An apparatus for checking a vehicle specification, comprising:

terminal devices provided in a vehicle; and a central vehicle configurator configured to receive control data between the terminal devices and to compare the received control data with information on prestored vehicle specification matters to output an error message when the control data does not match the information on the vehicle specification matters, wherein the control data is CAN message or signal based control data, and the signal based control data is configured by adding the control data generated from the terminal devices, to which a predetermined CAN ID is added, to a data field of the CAN message.

8. The apparatus of claim 7, wherein the central vehicle configurator checks information on an ID field when the control data is the CAN message based control data and outputs an error message when information on the ID field does not match information on the vehicle specification matters stored in the gateway.

9. The apparatus of claim 7, wherein the central vehicle configurator checks information on an ID field when the control data is the signal based control data and outputs an error message when a value of the data field of the signal based control data does not match the information on the vehicle specification matters stored in the gateway.

10. The method of claim 7, wherein the central vehicle configurator communicates with at least one of a plurality of CANs, local interconnect network (LIN), FlexRay, and Ethernet.

* * * * *